(12) United States Patent
Boock et al.

(10) Patent No.: US 8,308,103 B2
(45) Date of Patent: Nov. 13, 2012

(54) INSULATION OF AN AIRCRAFT FUSELAGE STRUCTURE

(75) Inventors: Klaus Boock, Timmdorf (DE); Ralf Grochulla, Hamburg (DE); Christian Becker, Hamburg (DE)

(73) Assignee: Airbus Operations GmbH (DE)

( * ) Notice: Subject to any disclaimer, the term of this patent is extended or adjusted under 35 U.S.C. 154(b) by 1016 days.

(21) Appl. No.: 12/227,499

(22) PCT Filed: Apr. 16, 2007

(86) PCT No.: PCT/EP2007/003331
§ 371 (c)(1),
(2), (4) Date: Nov. 17, 2008

(87) PCT Pub. No.: WO2007/131583
PCT Pub. Date: Nov. 22, 2007

(65) Prior Publication Data
US 2009/0090812 A1   Apr. 9, 2009

Related U.S. Application Data

(60) Provisional application No. 60/747,470, filed on May 17, 2006.

(30) Foreign Application Priority Data

May 17, 2006   (DE) .......................... 10 2006 023 209

(51) Int. Cl.
*B64C 1/40* (2006.01)
(52) U.S. Cl. ..................................... 244/1 N
(58) Field of Classification Search .................. 244/1 N, 244/121, 131, 119, 132, 171.7; 52/282.4, 52/407.4, 489.1, 404.2, 511, 506.05; 24/581.1, 297; 16/108–109
See application file for complete search history.

(56) References Cited

U.S. PATENT DOCUMENTS

| | | | |
|---|---|---|---|
| 2,118,998 A | 5/1938 | Alnut | |
| 3,712,846 A * | 1/1973 | Daniels et al. | 428/141 |
| 3,895,409 A * | 7/1975 | Kwatonowski | 16/2.1 |
| 4,313,524 A * | 2/1982 | Rose | 181/291 |
| 4,441,578 A * | 4/1984 | Rose | 181/222 |
| 4,781,503 A | 11/1988 | Bogel | |
| 4,926,963 A * | 5/1990 | Snyder | 181/290 |
| 5,177,922 A * | 1/1993 | Ovaert et al. | 52/410 |
| 5,426,905 A * | 6/1995 | Rollhauser et al. | 52/512 |
| 5,472,760 A | 12/1995 | Norvell | |
| 5,671,576 A * | 9/1997 | Kluser | 52/512 |
| 5,866,231 A | 2/1999 | Bodin et al. | |
| 6,358,591 B1 * | 3/2002 | Smith | 428/74 |

(Continued)

FOREIGN PATENT DOCUMENTS

DE   42 08 493 A1   9/1993

(Continued)

*Primary Examiner* — Tien Dinh
(74) *Attorney, Agent, or Firm* — Lerner, David, Littenberg, Krumholz & Mentlik, LLP

(57) ABSTRACT

An insulating mat for the sound insulation of an aircraft fuselage structure that is composed of frames and stringers extending transverse to the frames, to a fastener means for fastening an insulating mat on an aircraft fuselage structure such that acoustic bridges are prevented. An insulating kit is also provided that comprises at least one insulating mat as well as at least one fastener. The insulating mat features a plurality of fastening clips that are fixed on a first surface of the insulating mat and laterally protrude over the border of the insulating mat.

7 Claims, 4 Drawing Sheets

U.S. PATENT DOCUMENTS

| | | | |
|---|---|---|---|
| 7,584,582 B1 * | 9/2009 | Hutter, III | 52/506.02 |
| 7,797,893 B2 * | 9/2010 | Stahl et al. | 52/220.8 |
| 8,011,619 B2 * | 9/2011 | Mueller et al. | 244/121 |
| 2004/0131836 A1 | 7/2004 | Thompson | |

FOREIGN PATENT DOCUMENTS

| | | |
|---|---|---|
| DE | 100 41 458 A1 | 3/2002 |
| EP | 1310518 A1 | 5/2003 |
| FR | 1022731 A | 3/1953 |
| JP | 06 305489 A | 11/1994 |
| JP | H11502793 A | 3/1999 |
| JP | 2006513057 A | 4/2006 |
| RU | 2022817 C1 | 11/1994 |
| RU | 2196074 C2 | 1/2003 |
| RU | 2263124 C2 | 10/2005 |
| SU | 1770216 A1 | 10/1992 |
| WO | WO-93/14999 A | 8/1993 |
| WO | WO 93/19984 A1 | 10/1993 |
| WO | WO-97/27048 A1 | 7/1997 |

* cited by examiner

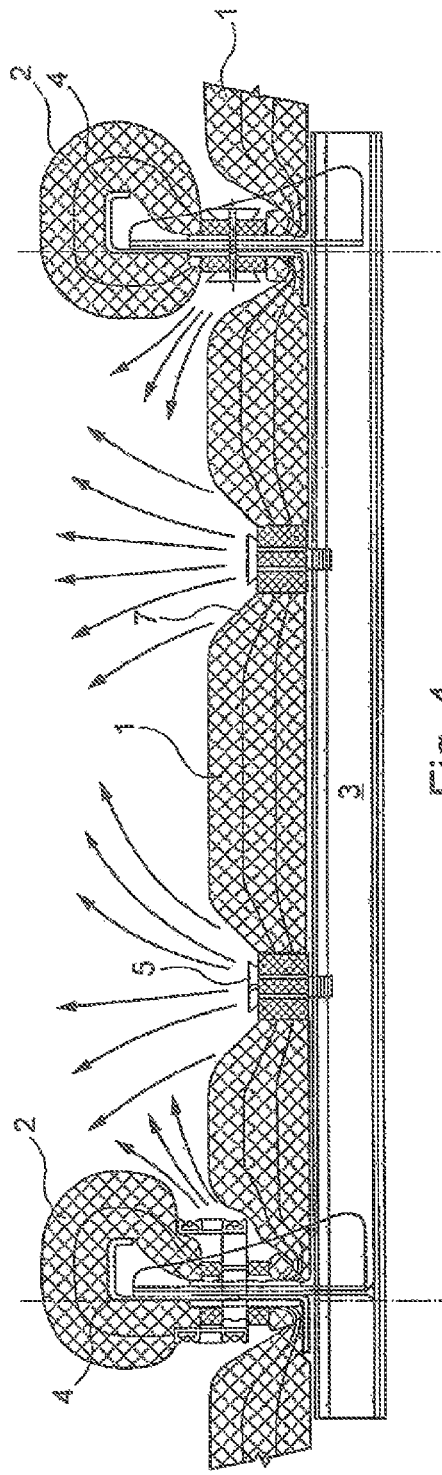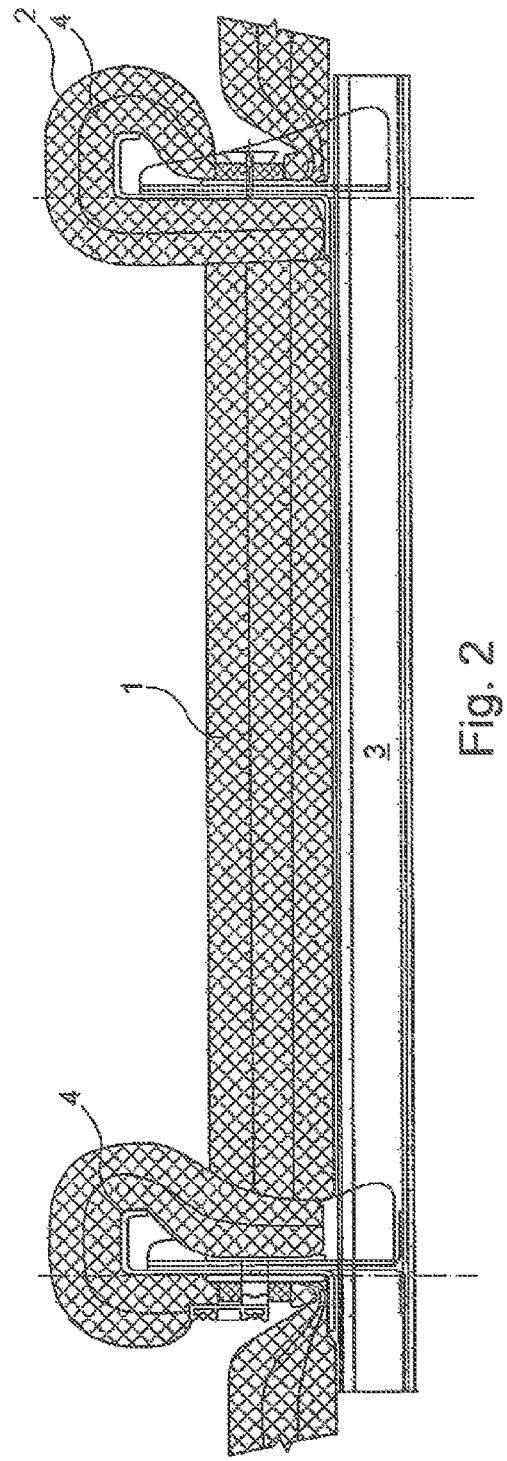

INSULATION OF AN AIRCRAFT FUSELAGE STRUCTURE

RELATED APPLICATIONS

This application claims the benefit of the filing date of U.S. Provisional Patent Application No. 60/747,470 filed May 17, 2006, and of the German Patent Application No. 10 2006 023 209.7 filed May 17, 2006, the disclosures of which are hereby incorporated herein by reference.

TECHNICAL FIELD

The present invention generally pertains to the technical field of acoustics. The invention specifically pertains to a specially designed insulating mat for insulating an aircraft fuselage structure relative to the passenger cabin or the cargo compartment formed by said aircraft fuselage structure in acoustic and partly also in thermic respects. In addition, the invention pertains to a specially designed fastening means for fastening an insulating mat on an aircraft fuselage structure in such a way that only few acoustic bridges, if any, are created. The present invention furthermore pertains to an insulating kit that comprises at least one inventive insulating mat as well as at least one inventive fastening means.

BACKGROUND OF THE INVENTION

In order to acoustically insulate the passenger cabin or the cargo compartment of an aircraft from external noises such as, for example, engine noises, the inside of an aircraft fuselage is frequently lined with insulating mats of glass wool. In this case, the insulating mats line the fuselage frames as well as the frame panels situated between the individual frames including the stringers. The insulation is fastened on the frame panels as well as on the frames that laterally border the frame panels with the aid of fir tree-shaped fastening needles and fastening disks pressed thereon as illustrated in an exemplary fashion in FIG. 1.

According to this figure, the insulation is substantially compressed in the region of the fastening needles in this fastening method such that the cover foils of the insulating mats are compressed or contracted. In these regions, however, where the insulation is compressed, the acoustic effect of the insulation is inferior to the same quantity of insulating material in its original thickness. In addition, the cover foil of the insulating mats is stretched over the disks fastened on the fastening needles such that the cover foil is disadvantageously subjected to vibrations originating from the aircraft fuselage via the fastening needles and the disks. The thusly induced vibrations are emitted in the form of noise waves via the funnel that results from the compression of the cover foil and is clearly visible in FIG. 1 similar to a loudspeaker such that the noise contamination may increase.

FIG. 1 furthermore shows that the insulating mat is substantially compressed in the region of the frames such that undesirable acoustic and thermal bridges are also created at these locations.

DISCLOSURE OF THE INVENTION

Based on the aforementioned problems associated with the described insulating structure, the present invention aims, among other things, to disclose an improved insulating structure with fewer acoustic bridges.

According to a first aspect of the present invention, the objective forming the basis thereof is attained with an insulating mat that is specially designed for the acoustic insulation of an aircraft fuselage structure composed of frames and stringers extending transverse to the frames. In order to fasten the edge regions of the insulating mat, for example, on an aircraft fuselage structure, particularly the frames, while simultaneously preventing any compression thereof, the inventive insulating mat features a multitude of fastening clips that are fixed on a first surface of the insulating mat and laterally protrude over the border of the insulating mat. In this context, the term first surface refers to the side of the insulating mat that faces away from the passenger cabin or the cargo compartment in the installed state of the insulating mat. The insulating mat can be fastened on the frames by providing the insulating mats with fastening clips on two edge regions that lie opposite of one another. In this case, punctiform fastening clips or strip-shaped fastening clips that extend in the insulating mat over the entire lateral border thereof may be used.

Due to the fact that the fastening clips laterally protrude over the lateral border of the insulating mat, it can be ensured that the insulating mat can be fastened to a fuselage structure, particularly the frames, by means of these fastening clips without affecting the insulating mat itself. For example, the insulating mat may be arranged in a frame panel, wherein the fastening clips of the first surface are positioned on the frames bordering the frame panel and fastened thereto. This makes it possible to simultaneously eliminate the acoustic weak point in the form of the gap resulting between the frame insulating mat and the panel insulating mat if the insulating mat is conventionally installed.

This structure may further allow an uncomplicated inspection of the electric lines that are frequently installed above the frame insulation with the aid of cable clamps such that the lines laterally extend along the frames, namely because the lateral edge of the insulating mat that laterally protrudes toward the frame can be simply folded away without having to uninstall the clips.

In order to prevent the insulating mats from sagging more or less loosely beyond their fastening points on the stringers, particularly in a ceiling installation, the inventive insulating mat may be coated with a thin layer such as, for example, a foil on a second surface intended to point in the direction of the passenger cabin or cargo compartment (in this context, the term second surface refers to the side of the insulating mat that lies opposite of the initially mentioned first surface), wherein this thin layer absorbs the tension exerted upon the insulating mat by the fastening means and thusly prevents sagging of the insulating mats. However, this may lead to the formation of the initially mentioned funnels around the fastening means that are caused by the tightening of the cover foil and can emit undesirable sounds similar to a loudspeaker if vibrations originating from the fastening elements are transmitted thereto. In order to prevent this foil-like layer from emitting acoustic sound waves into space, the foil-like layer may be at least regionally provided with holes. Such a perforation, in which the percentage of holes may exceed 30%, makes it possible to ensure that only little sound is emitted, if any, in case the foil-like layer is undesirably excited to vibrate. In this case, it may suffice to merely coat the second surface of the insulating mat with such a perforated foil at least in the region around the fastening means, wherein it would naturally also be possible to coat the entire first surface with a perforated foil.

Instead of being coated with a perforated foil, the insulating mat may also be coated with a netting on its second surface in order to transmit the forces exerted upon the insulating mat by the fastening means. The netting may consist of crisscrossing threads that may form triangular, quadrangular or polygonal mesh structures.

Since the insulating mat itself may consist of a fiber material such as, for example, glass wool that can act hygroscopically at correspondingly high relative humidities, the inventive insulating mat may furthermore be coated with an impervious cover film because water vapor naturally is able to penetrate the aforementioned perforated foil or netting, respectively. In order to prevent this admission of moisture to the fiber material of the insulating mat, the aforementioned impervious cover foil can be arranged such that the layer provided with holes lies between the cover foil and the insulating mat. Although it may suffice to provide the cover foil only on the side of the second surface of the insulating mat, the entire insulating mat including the perforated foil may be alternatively packed into and covered by such a cover foil.

In order to prevent the transmission of acoustic vibrations to the perforated foil via the fastening means and from the perforated foil to the cover foil in the regions in which the insulating mat is attached to the frames, for example, by means of suitable fastening means and thusly compressed, the cover foil may be at least regionally realized in a deformable fashion around the fastening points independently of the layer provided with holes. Due to the attachment of the insulating mat to an aircraft fuselage structure by means of suitable fastening means, the insulating mat including the applied perforated foil may, for example, be slightly compressed in the region of the fastening points, whereas the cover foil does not participate in this deformation around the tubular spacers, but rather remains in its original undeformed state and at least tends to preserve this state. Consequently, it can be ensured that the sound-deadening perforated foil does not lie on the cover foil in the region of the fastening points such that no structure-borne noise can be transmitted between these two foils.

In order to realize the aforementioned effect of an independent deformation between the cover foil and the layer provided with holes, the cover foil may be provided, for example, with a bulge in the region around the fastening points, wherein said bulge is lifted off the insulating mat such that a hill-like elevation is created. Although the cover foil comes in contact with the layer provided with holes in the immediate vicinity of the fastening points in this particular embodiment, this actually applies to only the immediate vicinity of the fastening points because the hill-shaped bulge of the cover foil protrudes inward in the direction of the layer provided with holes in a crater-shaped fashion within these regions and therefore contacts this layer provided with holes. However, since the foil is not tensioned but rather lose, the vibratory excitation is limited to a very small regional around the fastening points. Outside the fastening points, the cover foil is spaced apart from the layer provided with holes such that no transmission of structure-borne sound can take place in this region.

In order to actually fastening, the inventive insulating mat in the panel region features a multitude of tubular spacers and a corresponding number of through-openings, into which the tubular spacers are fitted such that the insulating mat can be attached to the aircraft fuselage structure through the tubular spacers with the aid of suitable fastening means.

In this case, the tubular spacers serve as a through-opening, through which a corresponding fastening means for fastening the insulating mat on the aircraft fuselage structure can extend. The tubular spacers furthermore act as a resistance element that is intended to prevent the insulating mat from being compressed.

In order to fulfill their function as resistance element, the tubular spacers are realized more rigid in the direction of their through-opening than the insulating mat is perpendicular to its surface such that the insulating mat itself may not be compressed as substantially as it would be the case without the spacers that act as resistance elements, for example, when a fastening disk is pushed on the corresponding fastening means in order to attach the insulting mat to an aircraft fuselage structure.

In order to fulfill these rigidity requirements, the tubular spacers may be made, for example, of a foamed material such as, e.g., polyimide or polyether foam. This means that the selection of a corresponding material for the tubular spacers makes it possible to achieve a higher modulus of elasticity than for the insulating mat itself such that the spacers react less compressible or more pressure-resistant and less deformable to a given tension than the insulating mat.

Due to the inventive design of the insulating mat with tubular spacers of specially selected materials such as, for example, foamed materials, fastening means can be guided through the tubular spacers in order to fasten the insulating mat on an aircraft fuselage structure and be fastened with a higher counterforce to the aircraft fuselage structure, namely without excessively deforming the insulating mat such that the formation of the aforementioned funnels with loudspeaker effect can be diminished.

Due to the above-described design of the insulating mat with tubular spacers, the insulating mat can be fastened in the panel region of the mat, for example, on the stringers of an aircraft fuselage structure. However, the above-described laterally protruding fastening clips serve for fastening the edge regions such that the insulating mats entirely can be installed without creating acoustic bridges.

According to another aspect of the present invention, a fastening means is disclosed that is specially designed for fastening an insulating mat on an aircraft fuselage structure, for example, on a frame or a stringer. The inventive fastening means is designed such that it is impossible to excessively compress the insulating mat so as to prevent the above-described undesirable excessive impression of funnels into the surface of the insulating mat.

The inventive fastening means comprises a linear, i.e. straight, shaft with a first end and a second end. On its first end, the shaft is provided with a fastening element for attaching the shaft to an aircraft fuselage structure in such a way that the shaft protrudes from the aircraft fuselage structure in order to penetrate or extend through an insulating mat. In the region of the second end that lies opposite of the first end, the shaft features a limit stop that prevents an abutment element such as, for example, the aforementioned fastening disk for fastening an insulating mat from being pushed or screwed onto the shaft farther than the limit stop. Consequently, the limit stop restricts the movement of an abutment element on the shaft in the direction of the first end.

The limit stop element may be, for example, of a flange that surrounds the shaft in a collar-like fashion such that an abutment element, for example, a fastening disk, can only be pushed or screwed onto the shaft up to the limit stop. The limit stop therefore prevents a fastening disk from being pushed onto the shaft farther than the limit stop such that the insulating mat may only be compressed as far as permitted by the limit stop when the insulating mat is fastened by means of such a fastening disk.

In order to allow quick attaching of the abutment elements on the shaft the shaft can have an arrangement at its second end, the arrangement having a multitude of barb elements which are adapted to secure an abutment element such as for example a fastening disk for fastening an insulation mat on the shaft. In this manner, an abutment element such as for example a fastening disk can be easily slid on to the second end of the shaft until it abuts the limit stop wherein the barb elements prevent an undesired releasing of the abutment elements from the shaft.

In order to fasten the fastening elements, their first shaft end features the aforementioned fastening element that may be realized, for example, in the form of a clamp designed for being attached to a stringer or example, a shaft can be fastened on a stringer by means of the clamp such that the insulating mats can be subsequently attached thereto. Alternatively, the fastening means or the shafts of the fastening means may be initially inserted through the corresponding tubular spacers of the insulating mats and fastened thereon such that the insulating mats provided with the fastening means in this manner can be subsequently fastened on an aircraft fuselage structure with the aid of the fastening means by simply pushing the clamps of the fastening elements on the stringers.

According to yet another aspect of the present invention, the objective forming the basis thereof may be attained with an insulating kit for the sound insulation of an aircraft fuselage structure that is composed of frames and stringers extending transverse to the frames, wherein said insulating kit comprises at least one insulating mat of the above-described type, as well as at least one fastening means of the type described in connection with the aforementioned methods.

BRIEF DESCRIPTION OF THE FIGURES

The invention is described in greater detail below with reference to the enclosed figures. At this point, it should be noted that the embodiments of the invention illustrated in the figures have a purely exemplary character and, in particular, should not be interpreted as restrictions of the scope of protection. In these figures:

FIG. 1 shows a detail of a longitudinal section through a conventionally sound-insulated aircraft fuselage structure;

FIG. 2 shows a detail of a longitudinal section through an insulated aircraft fuselage structure to be realized with the present invention;

Identical or similar elements are identified by the same or corresponding reference signs in all figures. Although the figures are not drawn true-to-scale, they may, however, reflect qualitative proportions in size.

DESCRIPTION OF EXEMPLARY EMBODIMENTS OF THE INVENTION

Figure 3:
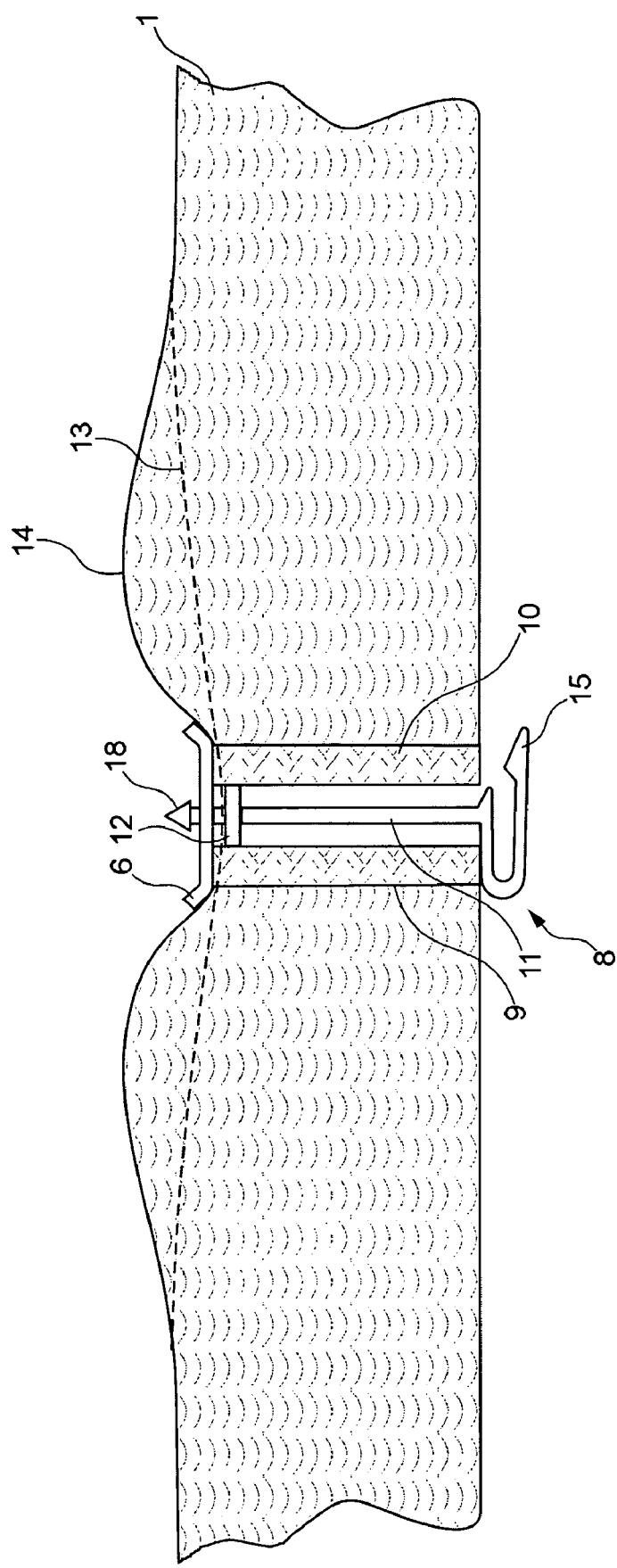
FIG. 3 shows a first embodiment of an inventive insulating kit.

A conventionally sound-insulated aircraft fuselage structure is initially described below with reference to FIG. 1 in order to better comprehend the invention. The aircraft fuselage structure consists of stringers 3 that extend in the longitudinal direction of an aircraft fuselage and frames 4 that carry the stringers 3 and extend perpendicular thereto. The aircraft fuselage structure is insulated by means of panel insulation 1 in the form of an insulating mat 1 in the frame panels situated between the respective frames 4. The frames 4 are also insulated with the aid of insulating mats 2 that are wound around the frames 4 and fastened thereon with the aid of suitable fastening means 5. The panel insulation 1 is installed with fastening means 5 in the form of so-called "fir trees" 5, i.e., fir tree-shaped fastening needles, that are attached to the stringers 3. These "fir trees" 5 are pushed through the insulation such that for fixation of the panes insulation 1 fastening disks 6 can be attached to the "fir trees" 5 in order to fix the panel insulation 1 on the stringers 3. When the fastening disks 6 are attached to the "fir trees" 5, the insulating mat 1 is compressed in a punctiform fashion as clearly illustrated in FIG. 1 such that funnel-shaped depressions 7 are created in the insulating mat 1 which undesirably emit acoustic sound waves transmitted via the fastening means 6 into space as indicated with arrows in FIG. 1.

In addition, the panel insulation 1 is also substantially compressed in the region of the frames 4 such that undesirable acoustic bridges are also created at these locations due to the compression of the insulating mat 1.

Since such compressions of the sound insulation can represent acoustic bridges, the present invention aims to disclose a sound insulation for an aircraft fuselage structure 3, 4 of the type illustrated in the central frame panel in FIG. 2. In this sound insulation, the panel insulation 1 is not compressed anywhere, i.e., it lies completely relaxed in the frame panel and toward the frame also overlaps the frame insulation such that acoustic bridges are prevented at these locations as well.

In order to achieve the ideal state illustrated in FIG. 2, the present invention proposes an insulating kit as well as its individual components as illustrated in FIGS. 3 to 7.

FIG. 3 shows an insulating kit according to the invention with an inventive insulating mat 1 as well as an inventive fastening means 8 in the form of a cross-sectional representation. The insulating mat 1 consists of a fiber material such as, for example, a non-woven fiber glass fabric. The inventive insulating mat 1 features a multitude of through-openings 9, into which tubular spacers 10 are fitted such that the insulating mat 1 can be attached through the tubular spacers 10 to an aircraft fuselage structure with the aid of suitable fastening means 8. Only one through-opening 9 and one tubular spacer 10 fitted therein are illustrated in the detail according to FIG. 3.

The tubular spacer 10 has a longitudinal dimension that extends in the direction of its through-opening that essentially corresponds to the thickness of the insulating mat 1 such that the spacer 10 ends flush with the two opposite surfaces of the insulating mat 1.

In order to fasten the insulating mat 1 on a stringer 3, the fastening means 8 can be inserted through the through-opening of the spacer 10 such that the insulating mat 1 can be fixed on the shaft 11 of the fastening means 8 with the aid of a fastening disk 6 that can be attached to the shaft 11 of the fastening means 8.

In order to prevent excessive compression of the insulating mat 1 during this fixing process as well as the disadvantageous acoustic bridges resulting thereof, the tubular spacers 10 are realized more rigidly than the insulating mat 1 itself in the direction of their through-openings such that the insulating mat 1 can only be deformed slightly when the fastening disk 6 is attached to the shaft 11 of the fastening means 8. The tubular spacer 10 may be made, for example, of a foamed material with a higher modulus of elasticity than the insulating mat 1.

In order to further restrict the maximum compressibility of the insulating mat 1, the shaft 11 is surrounded at its free end in a collar-like fashion by a flange 12 that is intended as a limit stop for the fastening disk 6 such that the fastening disk 6 can only be pushed on the shaft 11 until it comes in contact with the flange 12. The compression of the insulating mat 1 and therefore the formation of acoustic bridges can be prevented in this fashion.

Although the transmission of acoustic sound waves can already be significantly reduced with the above-described measures, an even superior sound insulation can be realized by providing the insulating mat 1 with a perforated foil 13 at least in the region around the through-openings 9 as shown in FIG. 3. A transmission or emission of sound can be largely prevented due to the perforation of the perforated foil 13 that may have a hole ratio of more than 30% such that possibly occurring structure-borne sound transmitted to the foil via the fastening means 5 cannot be emitted into space.

In order to also provide the insulating mat with the required imperviousness in the regions in which it is coated with the perforated foil 13, the insulating mat 1 may be coated with an impervious cover foil 14 in these regions such that the perforated foil 13 lies between this cover foil 14 and the insulating mat 1 as illustrated in FIG. 3. In order to prevent the transmission of acoustic sound waves from the perforated foil 13 to the cover foil 14 and the emission thereof from the cover foil into space, the cover foil 14 features a bulge 15 in the region around the through-openings 9 and in the regions in which the insulating mat 1 is provided with a perforated foil 13, wherein said bulge makes it possible for the cover foil 14 to deform independently of the foil 13 provided with holes in the region around the through-openings. Such a state is illustrated in FIG. 3.

In order to install the pre-assembled insulating kit, the fastening means 8 features a clamp 15 on the end that lies opposite of the flange 12, wherein the insulating mat 1 can be simply attached to a stringer 3 by means of said clamp. Alternatively, the installation may naturally also be carried out such that the fastening means 8 are initially attached to the stringers 3 by means of the clamps 15 and an insulating mat 1 is subsequently attached to the fastening means 5 or their shafts 11, respectively, in order to be subsequently fixed on the fastening means 8 with the aid of fastening disks 6.

Figure 4:
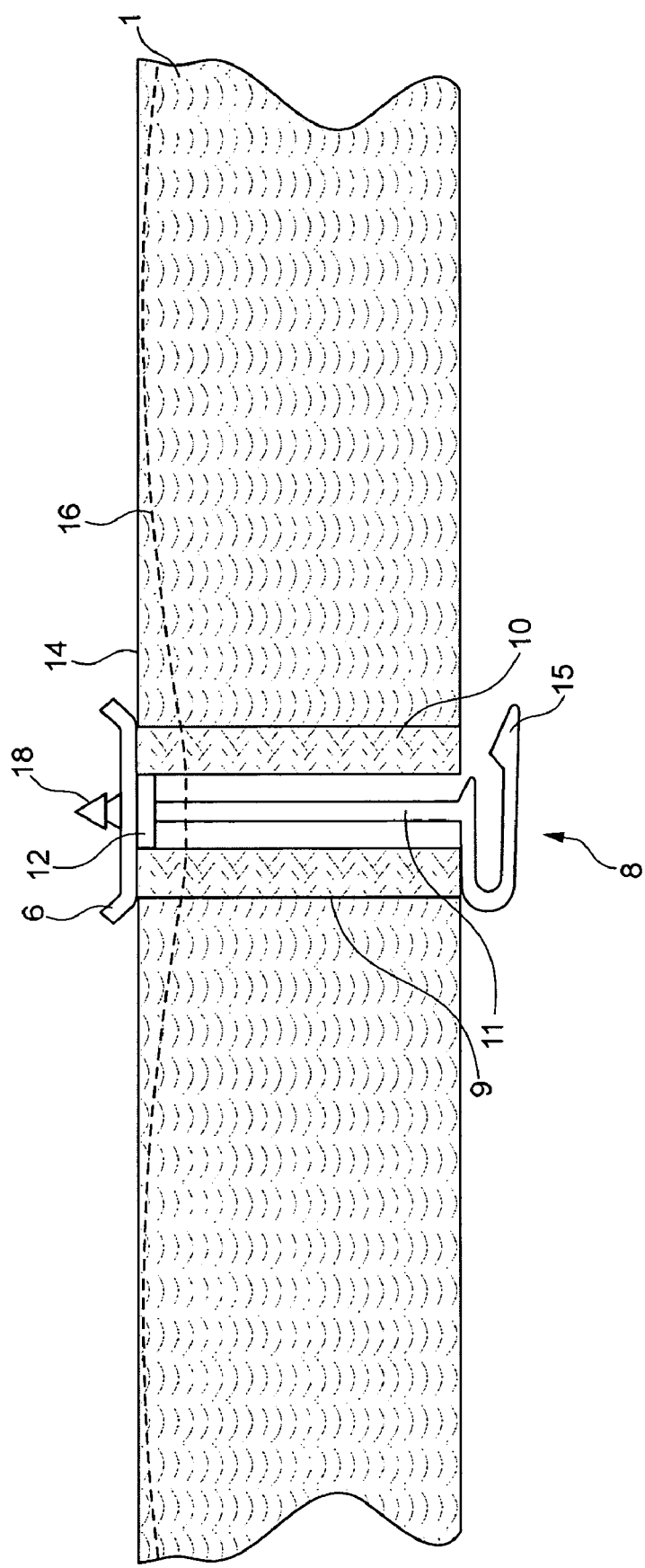
FIG. 4 shows a second embodiment of an inventive insulating kit.

FIG. 4 shows another embodiment of the inventive insulating mat. This second embodiment can only be distinguished from the above-described first embodiment in that the perforated foil 13 is realized in the form of a netting 16 in this case, and by the formation of the cover foil 14. In contrast to the first embodiment, in which the surface of the insulating mat is provided with a perforated foil 13 in the non-deformed state, a netting 16 is applied to the insulating mat 1 in the deformed state in the second embodiment according to FIG. 4 instead of the perforated foil 13, as shown in FIG. 4. In this case, the insulating mat 1 is deformed in such a way that the surface of the insulating mat is slightly compressed in a trough-like fashion in the region around the tubular spacer 10 such that the spacer 10 slightly protrudes over the first surface of the insulating mat 1. The netting 16 is applied on this first surface in the deformed configuration of the insulating mat 1 and connected to the insulating mat as well as to the spacers 10 such that the deformed configuration of insulating mat 1 is permanently preserved due to the attachment of the netting 16 to the spacers 10. Subsequently, an impervious cover foil 14 is applied over the entire surface of the insulating mat 1 such that the cover foil 10 spans the trough created due to the compression of the insulating mat 1. The cover foil 14 is also decoupled from the netting 16 in this second embodiment such that no sound transmission caused by structure-borne sound can take place.

Figure 5:
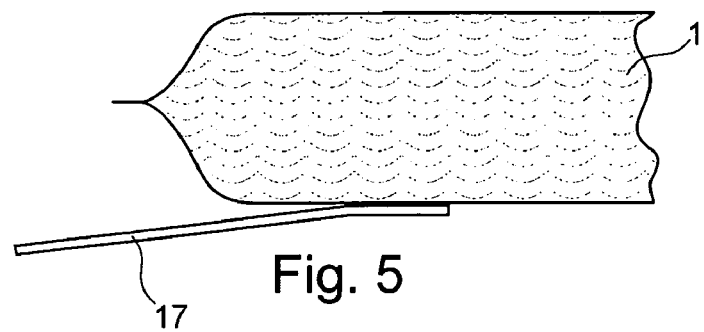
FIG. 5 shows a cross section through the edge region of an inventive insulating mat.
Figure 6:
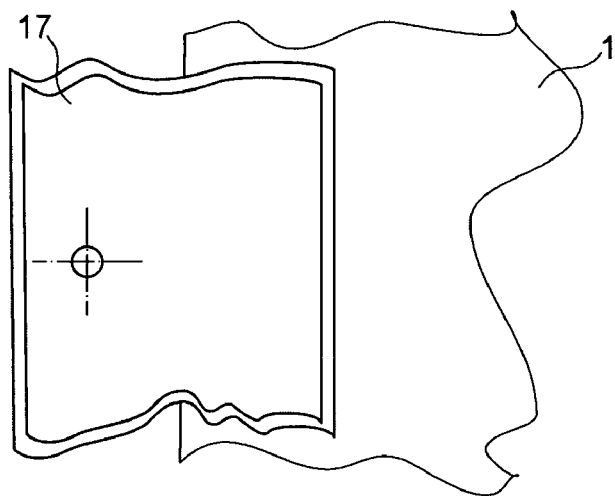
FIG. 6 shows a bottom view of the insulating mat according to FIG. 5.

The fastening of the insulating mat 1 in the edge region is described below with reference to FIGS. 5 to 7. According to the invention, the insulating mat 1 is equipped with a multitude of fastening clips 17 that are arranged on the surface of the insulating mat 1 that lies opposite of the surface coated with the perforated foil 13. In order to prevent the necessity of compression of the insulating mat 1 in the edge region for the fastening process, the fastening clips 17 protrude over the lateral border of the insulating mat 1 such that the insulating mat 1 can be fastened at the desired location such as, for example, a frame 4 with the aid of the clips 17 as illustrated in FIG. 7.

The fastening clips 17 may be, for example, of flexible plastic strips that can be slightly bent during to fastening process so as to adapt the plastic strips to predefined geometries. For fastening, the fastening clips 17 are provided with corresponding holes, through which fastening elements 8 can be inserted.

Figure 7:
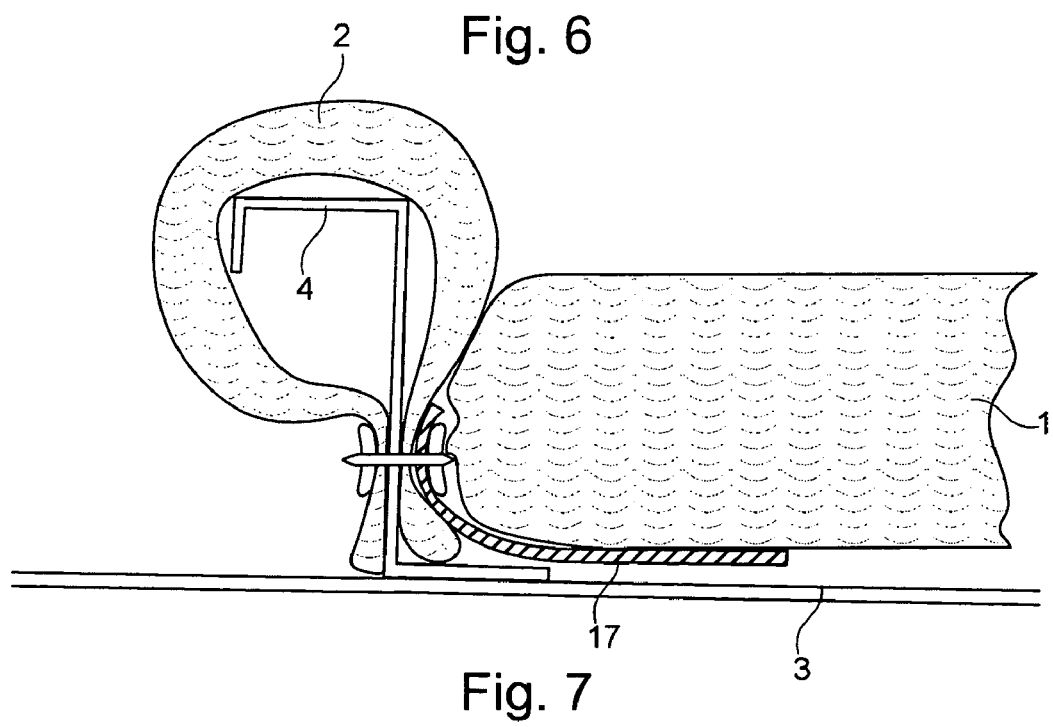
FIG. 7 shows a cross-sectional representation of one option for attaching an inventive insulating mat to an aircraft frame by means of a clip.

According to FIG. 7, the fastening clip 17 is bent at this location such that its fastening hole lies on the lateral edge of the insulating mat 1 such that the insulating mat 1 can be fastened on a frame 4 together with the fastening for the frame insulation 2 by means of the fastening clips 17. Due to these measures, the panel insulation 1 in the form of an inventive insulating mat 1 overlaps the frame insulation 2 such that the panel insulation 1 does not have to be compressed in the frame region whereby the formation of undesirable acoustic bridges is prevented.

Consequently, the present invention for the first time proposes an insulating kit for the sound insulation of aircraft fuselage constructions that makes it possible to largely prevent undesirable acoustic bridges.

In addition, it should be noted that "comprising" does not exclude any other elements or steps and that "a" or "an" does not exclude a multitude. It should furthermore be noted that characteristics or steps that were described with reference to one of the above-discussed embodiments can also be used in combination with other characteristics or steps of other above-discussed embodiments. The reference symbols in the claims should not be interpreted in a restrictive sense.

LIST OF REFERENCE SYMBOLS

1 Panel insulation/insulating mat
2 Frame insulation
3 Stringer
4 Frame
5 Fastening means/fir tree
6 Fastening disk
7 Funnel
8 Fastening means
9 Through-opening
10 Spacer
11 Shaft
12 Flange
13 Perforated foil
14 Cover foil
15 Clamp
16 Netting
17 Fastening clip
18 Barb element

The invention claimed is:

1. An insulating mat for the sound insulation of an aircraft fuselage structure comprising frames and stringers extending transverse to the frames, wherein the insulating mat comprises:

a plurality of fastening clips for fastening edge regions of the insulating mat on the frames of the aircraft structure, the fastening clips being fixed on a first surface of the insulating mat and laterally protruding over the border of the insulating mat;

a layer with a plurality of holes, wherein a second surface of the insulating mat at least in a region around fastening points, where the mat is to be fastened to the stringers by fastening means through a plurality of through-openings in the mat, is coated by the layer, wherein the layer is adapted to absorb tension exerted upon the insulating mat by said fastening clips when fastened to the stringers for preventing sagging of the insulation mat; and an impervious cover foil arranged such that the layer lies between the cover foil and the insulating mat;

wherein the cover foil is regionally decoupled from the layer such that the cover foil is deformable in the region around the through-openings independently of the layer.

2. The insulating mat of claim 1,
wherein the layer provided with the holes comprises a perforated foil.

3. The insulating mat of claim 1,
wherein the layer provided with the holes comprises a netting.

4. The insulating mat of claim 1,
wherein the cover foil in the region around the fastening points of the insulating mat comprises a bulge which elevates from the insulating mat.

5. The insulating mat of claim 1, further comprising:
a plurality of tubular spacers,
wherein the insulating mat comprises a plurality of through-openings, into which the tubular spacers are fitted such that the insulating mat is attachable through the tubular spacers to the aircraft fuselage structure.

6. The insulating mat of claim 5,
wherein the tubular spacers are more rigid in the direction of their through-opening than the insulating mat, the direction being perpendicular to the first and second surfaces of the insulation mat.

7. The insulating mat of claim 5,
wherein the tubular spacers are made of a foamed material.

* * * * *